United States Patent
Ohm et al.

(10) Patent No.: US 10,556,576 B2
(45) Date of Patent: Feb. 11, 2020

(54) BRAKE BOOSTER AND BRAKE SYSTEM

(71) Applicant: Robert Bosch GmbH, Stuttgart (DE)

(72) Inventors: Andreas Ohm, Kupferzell (DE); Andreas Deberling, Erdmannhausen (DE); Daniel Weissinger, Korntal-Muenchingen (DE); Willi Nagel, Remseck/Hochdorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/759,748

(22) PCT Filed: Jul. 13, 2016

(86) PCT No.: PCT/EP2016/066632
§ 371 (c)(1),
(2) Date: Mar. 13, 2018

(87) PCT Pub. No.: WO2017/045797
PCT Pub. Date: Mar. 23, 2017

(65) Prior Publication Data
US 2019/0047532 A1    Feb. 14, 2019

(30) Foreign Application Priority Data
Sep. 14, 2015 (DE) .......... 10 2015 217 531

(51) Int. Cl.
*B60T 13/74* (2006.01)
*F16H 25/20* (2006.01)
(Continued)

(52) U.S. Cl.
CPC .......... *B60T 13/745* (2013.01); *B60T 13/143* (2013.01); *F16H 25/2003* (2013.01); *F16H 25/24* (2013.01)

(58) Field of Classification Search
CPC ...... F16D 65/18; F16D 65/28; F16D 65/0043; F16D 55/225; F16D 55/226;
(Continued)

(56) References Cited

U.S. PATENT DOCUMENTS 4,395,883 A * 8/1983 Melinat ................ B60T 13/745
60/545
4,679,458 A * 7/1987 Brandenstein .......... F16H 25/24
74/424.75
(Continued)

FOREIGN PATENT DOCUMENTS

CN       105398439 A    3/2016
DE    102012014361 A1    1/2014
(Continued)

OTHER PUBLICATIONS

International Search Report dated Sep. 28, 2016 of the corresponding International Application PCT/EP2016/066632 filed Jul. 13, 2016.

Primary Examiner — Robert A. Siconolfi
Assistant Examiner — San M Aung
(74) Attorney, Agent, or Firm — Norton Rose Fulbright US LLP; Gerard Messina

(57) ABSTRACT

A brake booster for a brake master cylinder of a motor vehicle includes a drive motor that is connected/connectable by a gear unit to a pressure piston for the brake master cylinder, the gear unit converting a rotational motion of the drive motor into a translational motion of the pressure piston to actuate the brake master cylinder, and the gear unit including a rotatable spindle nut and a non-rotatable spindle rod having intermeshing trapezoidal threads that have have a flank clearance and a tip clearance that are greater than a bottom clearance.

10 Claims, 2 Drawing Sheets

(51) Int. Cl.
*F16H 25/24* (2006.01)
*B60T 13/14* (2006.01)

(58) Field of Classification Search
CPC ............. F16D 2121/24; F16D 2125/40; F16D 2125/48; F16D 2127/06; F16H 25/24; F16H 57/0497; B60T 7/042; B60T 7/085; B60T 13/741; B60T 13/745
USPC ....................................................... 303/114.1
See application file for complete search history.

(56) References Cited

U.S. PATENT DOCUMENTS

| | | | | |
|---|---|---|---|---|
| 8,348,352 | B2* | 1/2013 | Nishino | B60T 7/042 |
| | | | | 303/115.2 |
| 8,899,696 | B2* | 12/2014 | Weiberle | B60T 1/10 |
| | | | | 303/113.4 |
| 2011/0132704 | A1* | 6/2011 | Hanlon | B60T 7/042 |
| | | | | 188/156 |

FOREIGN PATENT DOCUMENTS

| | | |
|---|---|---|
| DE | 102013006795 A1 | 10/2014 |
| DE | 112014000559 T5 | 10/2015 |
| JP | 2014196784 A | 10/2014 |
| WO | 2014115874 A1 | 7/2014 |

\* cited by examiner ved in a rotary manner and actuates the pressure piston in the translational direction by means of the trapezoidal thread.

BRAKE BOOSTER AND BRAKE SYSTEM

CROSS-REFERENCE TO RELATED APPLICATIONS

The present application is the national stage of International Pat. App. No. PCT/EP2016/066632 filed Jul. 13, 2016, and claims priority under 35 U.S.C. § 119 to DE 10 2015 217 531.6, filed in the Federal Republic of Germany on Sep. 14, 2015, the content of each of which are incorporated herein by reference in their entireties.

FIELD OF THE INVENTION

The present invention relates to a brake booster for a brake master cylinder of a motor vehicle, having a drive motor that is connected or connectable by a gear unit to a pressure piston for the brake master cylinder, the gear unit converting a rotational motion of the drive motor into a translational motion of the pressure piston to actuate the brake master cylinder, and to that end, the gear unit featuring a rotatable spindle nut and a non-rotatable, axially displaceable spindle rod having intermeshing trapezoidal threads. The present invention also relates to a brake system having such a brake booster.

BACKGROUND

Brake boosters and brake systems are already known from the related art. Thus, for example, the laid open print DE 10 2012 014 361 A1 describes a brake booster for a brake master cylinder of a motor vehicle, that has a drive motor and a gear unit connecting the drive motor to a pressure piston of the brake master cylinder. In that case, the gear unit has a section taking the form of a spindle gear in order to convert a rotational motion of the drive motor into a translational motion of the pressure piston to actuate the brake master cylinder. To that end, the spindle gear has a spindle nut having an internal thread and a spindle rod having an external thread, the two threads engaging with each other in order to convert the rotational motion into a translational motion. It is known to provide spindle gears with a trapezoidal thread, so that both the internal thread and the external thread are formed as trapezoidal threads and engage with each other accordingly. With respect to the design of trapezoidal thread gearings, the DIN standard 103 is known, which is intended for a steel-steel material pairing and provides for keeping flank clearances between the trapezoidal threads, thus, between the external thread and the internal thread, as small as possible, in order to avoid sound and acoustic noise in response to a change of direction of force and movement.

SUMMARY

The brake booster of the present invention has an advantage that the service life of the brake booster is increased compared to known brake boosters of the type according to the species. This is achieved according to the present invention because the intermeshing trapezoidal threads have a flank clearance and a tip clearance which are greater than a bottom clearance. Thus, the invention provides clearances between the trapezoidal threads which purposefully differ from each other. In this context, the tip clearance is understood to be the radial clearance between the tooth tip of the external thread and the tooth bottom of the internal thread, and the bottom clearance is understood to be the clearance between the tooth bottom of the external thread and the tooth tip of the internal thread. Viewed in the circumferential direction or direction of rotation, the flank clearance lies between the mutually opposite tooth flanks of the trapezoidal thread. Because the flank clearance and the tip clearance are greater than the bottom clearance, advantageous grease depositories are formed which, in response to a direction reversal of the drive of the spindle gear, are influenced by the turning of the external thread relative to the internal thread in such a way that lubricant in the grease depositories is purposefully circulated within the toothing. To that end, expediently, the driving of the brake booster is reversed periodically in order to ensure circulation of the lubricant between the trapezoidal threads.

Preferably, the flank clearance amounts to 8-12%, especially 10%, of the tooth width of the trapezoidal thread of the spindle nut. Consequently, the flank clearance is already markedly greater than the minimal flank clearance stipulated by the DIN unit 3. The size of the flank clearance ensures that as a result of the flanks of the teeth pushed toward each other, the lubricant is forced outwardly in the direction of the tooth tip, and there, owing to the tip clearance, is conveyed up to the other tooth flank. This ensures that the lubricant is circulated reliably, and consequently the trapezoidal threads are permanently well-lubricated, thus reducing wear and friction and increasing the service life of the brake booster.

Preferably, for this purpose, the tip clearance amounts to 8-12%, especially 10%, of the width of the tooth of the trapezoidal thread of the spindle nut. This ensures that the lubricant is conveyed through in the tip area of the tooth of the external thread.

According to a preferred example embodiment of the invention, the bottom clearance has a safety-related minimum size. Thus, the bottom clearance is selected to be as small as possible and as large as necessary to ensure safe operation of the brake booster, especially of the spindle gear. In so doing, it is specially taken into account that the bottom clearance is selected to be large enough to safely prevent the spindle gear from jamming.

According to a preferred example embodiment of the invention, the spindle rod forms the pressure piston. Consequently, the pressure piston of the brake master cylinder is an integrated component of the brake booster or rather of the spindle gear. This ensures an especially compact embodiment of the brake booster.

According to a preferred example embodiment of the invention, the spindle nut has an external toothing that engages with an internal toothing of a drive ring gear of the gear unit. The spindle nut is thus guided in the drive ring gear and driven by it. Compact power transmission from the drive motor to the spindle nut is thereby ensured.

Particularly preferred, the external toothing and the internal toothing are formed in such a way that the spindle nut is displaceable axially with respect to the drive ring gear. The toothing between the spindle nut and the drive ring gear thus ensures an axial relative movement between the spindle nut and the drive ring gear. In particular, this ensures that the pressure piston which forms the spindle rod is able to be operated by a driver or user by actuating a brake pedal independently of the brake booster. If the user exerts an axial force on the pressure piston, the user then possibly shifts the spindle nut axially relative to the drive ring gear. Owing to the advantageous toothing between the spindle nut and the drive ring gear, in this case, it is ensured that regardless of the axial position of the spindle nut relative to the drive ring gear, by driving of the electric motor, the spindle nut can be set into rotational movement in order to apply an additional actuating force to the pressure piston.

It is further advantageously provided that the spindle nut has an axial stop interacting with the drive ring gear. The axial stop ensures that the spindle nut cannot be shifted beyond the drive ring gear. Rather, an end stop is provided which ensures a reliable initial position of the spindle nut.

Particularly preferred, at least one spring element presses the spindle nut with the axial stop against the drive ring gear. In this manner, a defined initial position is ensured for the displaceable spindle nut, into which the spindle nut is moved back when, for example, the driver is exerting no force on a brake pedal that is connected to the pressure piston. The system or rather the gear unit is preloaded by the spring element, and safe operation is ensured.

According to an example embodiment, a brake system includes a brake booster according to any of the example embodiments describes herein. The advantages already cited are thereby obtained.

The invention is explained in greater detail below on the basis of the drawings.

DETAILED DESCRIPTION

Figure 1:
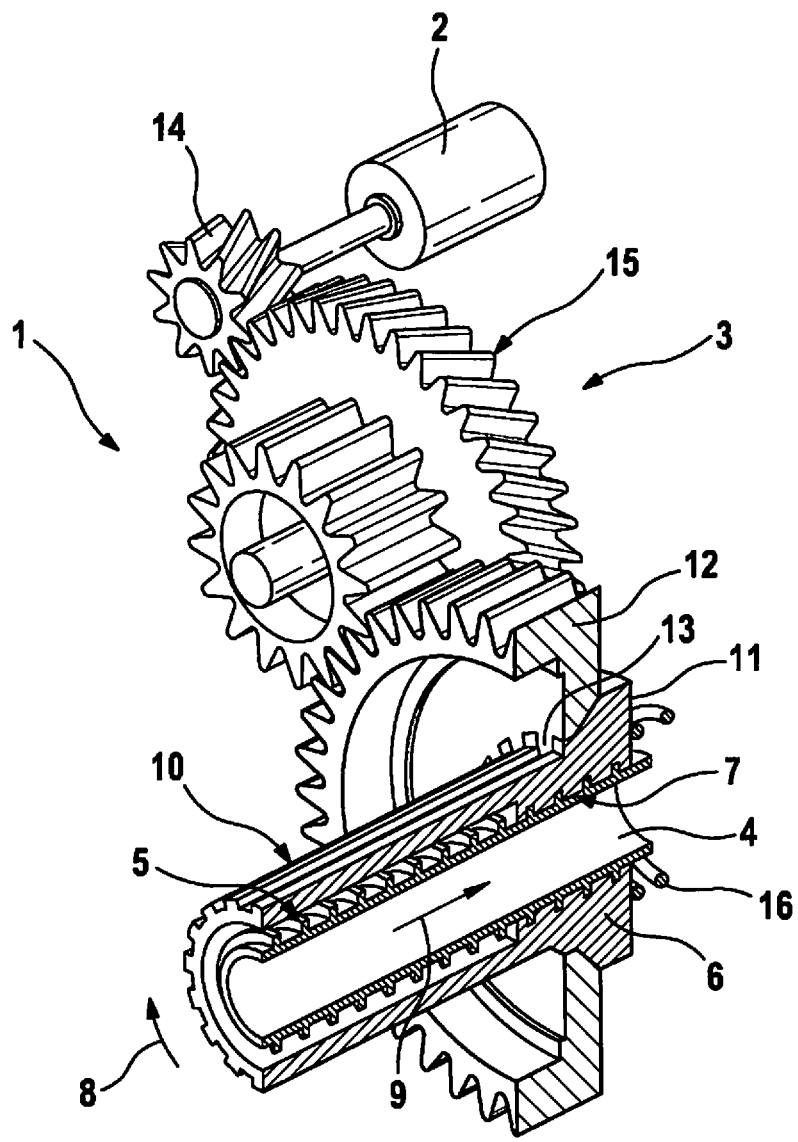
FIG. 1 shows a brake booster for a brake master cylinder of a motor vehicle in a simplified representation, according to an example embodiment of the present invention.

FIG. 1 shows a simplified representation of a brake booster for a brake master cylinder (not shown in greater detail here) of a motor vehicle. Brake booster 1 has a drive motor 2 (shown simplified here), which takes the form of an electric motor and is operatively connected by a gear unit 3 to a pressure piston. In the present case, the pressure piston is shown only sectionally and in a longitudinal section. The pressure piston is formed as a hollow rod which has an external thread 5. Axially, the pressure piston is connected mechanically at one end to the brake master cylinder and at the other end to a brake pedal of the motor vehicle having brake booster 1. The pressure piston is axially displaceable in order, upon actuation of the brake pedal, to exert a force on the brake master cylinder to actuate it.

Pressure piston 4 forms through external thread 5 a spindle rod, on which a spindle nut 6 is rotatably mounted. Sectionally, spindle nut 6 has an internal thread 7 which meshes with external thread 5. In this context, external thread 5 and internal thread 7 each take the form of a trapezoidal thread. Viewed axially, external thread 5 extends over a section more than twice as large as internal thread 7. If spindle nut 6 is set into a rotational motion, as indicated by an arrow 8, due to the intermeshing trapezoidal threads, this leads to an axial displacement of pressure piston 4 forming the spindle rod, as shown by an arrow 9.

In addition, spindle nut 6 has an external toothing 10, having a plurality of axially extending teeth. Moreover, at one end, spindle nut 6 has an axial stop 11 which has a tapered longitudinal section.

Gear unit 3 furthermore has a drive ring gear 12, which has an internal toothing 13 meshing with external toothing 10. Because external toothing 10 and internal toothing 13 are axially aligned, spindle nut 6 is displaceable axially relative to drive ring gear 12. In addition, drive ring gear 12 has an external toothing by which drive ring gear 12 is operatively connected to an intermediate gear wheel 15 that has a gear step and which meshes with a drive pinion 14 of electric motor 2.

If electric motor 2 is driven, a torque is then exerted on drive ring gear 12 which, by way of internal toothing 13, carries along spindle nut 6 and sets it in rotational movement. Because spindle rod 4 or pressure piston is mounted in rotatably fixed fashion, owing to the rotation of spindle nut 6, an axial movement of the pressure piston is generated and the brake master cylinder is actuated. An automatic braking procedure can thus be initiated, or the driver can be assisted by the generation of an additional braking force. If the driver actuates the brake pedal faster than electric motor 2 is able to react, or if electric motor 2 or brake booster 1 exhibits a defect, then because of the axial displaceability of spindle nut 6 relative to drive ring gear 12, it is possible for the driver to actuate the pressure piston purely mechanically. In so doing, the driver pushes the spindle rod together with spindle nut 6 axially through drive ring gear 12. Spindle nut 6 with axial stop 11 is pressed back by a spring element 16, particularly a helical spring, against drive ring gear 12 so that axial stop 11 rests against drive ring gear 12, and a further displacement is impossible. In this respect, gear unit 3 is preloaded by spring element 16 in the direction of an initial state.

Figure 2:
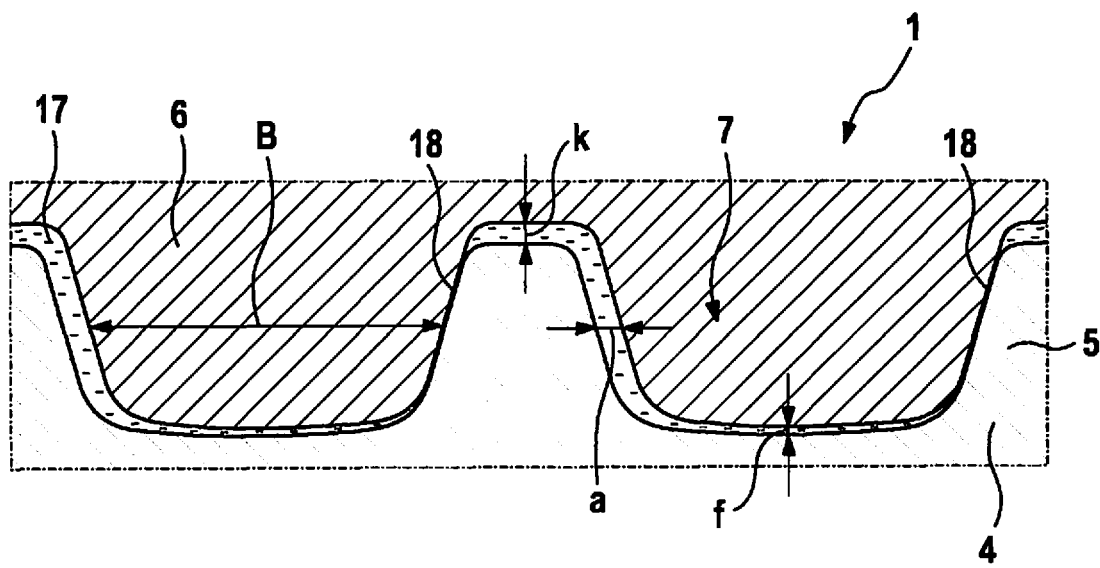
FIG. 2 shows a sectional view through a gear unit of the brake booster according to a first operating state, according to an example embodiment of the present invention.

FIG. 2 shows an enlarged representation of gear unit 3 in the area of the trapezoidal thread. Normally, trapezoidal threads are produced in such a way that the clearance between internal thread and external thread, especially the flank clearance, is as small as possible in order to avoid idle motion and noise in response to a change in the direction of rotation of the spindle nut. However, the present example embodiment provides that a tip clearance k between the thread tip of external thread 5 and the thread bottom or thread base of internal thread 7, a bottom clearance f between the thread bottom of external thread 5 and the thread tip of internal thread 7, as well as a flank clearance a between mutually opposite tooth flanks are formed in a specific ratio to each other, in order to increase the service life of brake booster 1.

Figure 3:
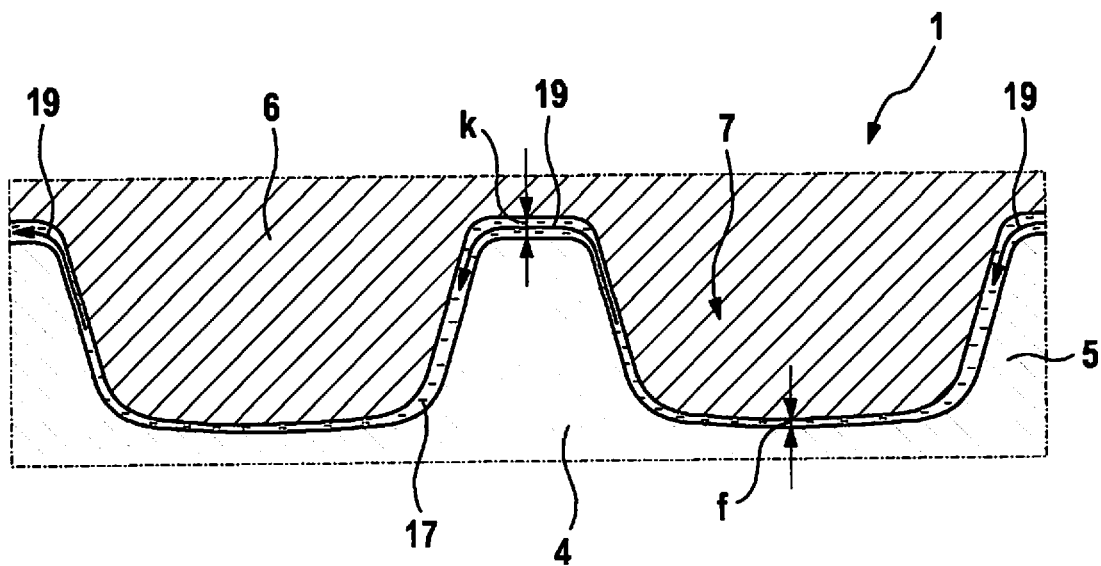
FIG. 3 shows the sectional view of the gear unit according to a second actuation state, according to an example embodiment of the present invention.

In the present case, tip clearance k and flank clearance a are larger in relation to bottom clearance f. In particular, in this case, flank clearance a corresponds to 10% of tooth width B of internal thread 7 of spindle nut 6. Moreover, tip clearance k likewise corresponds to 10% of tooth width B of internal toothing 7 of spindle nut 6. Bottom clearance f has a minimum size which ensures that under all anticipated operating and environmental conditions, especially in terms of temperature and air humidity, jamming of the toothing is safely prevented. Thus, bottom clearance f, in due consideration of the minimum size, is selected to be as small as possible. Between external thread 5 and internal thread 7, a lubricant 17 is expediently provided, which reduces the abrasion between spindle nut 6 and pressure piston 4. During normal operation, the working load is carried over working flanks 18 lubricated at the outset. In order to regularly supply working flanks 18, which during normal operation abut one other for the transmission of power, with sufficient lubricant or to relubricate them, brake booster 1 is operated backwards at regular intervals, so that the direction of rotation of spindle nut 6 is reversed and the working flanks change. In so doing, flank clearance a is overcome, as shown particularly in FIG. 3. In this case, upon closure of flank clearance a, available lubricant 17 is shifted into the area of working flanks 18, as shown by arrows 19 in FIG. 3. If the system is now operated normally again in order, for example, to generate a braking force electromotively, threads 5, 7 abut against each other at their newly lubricated working flanks.

Owing to the present design of brake booster 1, a long service life is thus achieved in an easy manner. In this context, a logic which, for example, is implemented in a control unit assigned to brake booster 1, ensures that the actuating direction of the spindle gear is reversed at regular intervals in order to redistribute the lubricant.

Further advantages and preferred features are derived especially from the previous description as well as from the claims.

What is claimed is:

1. A brake booster for a brake master cylinder of a motor vehicle, the brake booster comprising:
   a drive motor; and
   a gear unit that is configured to convert a rotational motion of the drive motor into a translational motion of a pressure piston to actuate the brake master cylinder and that includes:
      a rotatable spindle nut including a first trapezoidal thread; and
      a non-rotatable spindle rod including a second trapezoidal thread that intermesh with the first trapezoidal thread with a flank clearance and a tip clearance that are greater than a bottom clearance between the first and second threads;
   wherein the spindle nut includes an external toothing that engages with an internal toothing of a drive ring gear of the gear unit.

2. The brake booster of claim 1, wherein the flank clearance is 8-12% of a tooth width of the trapezoidal thread.

3. The brake booster of claim 1, wherein the flank clearance is 10% of a tooth width of the trapezoidal thread.

4. The brake booster of claim 1, wherein the tip clearance is 8-12% of a tooth width of the trapezoidal thread.

5. The brake booster of claim 1, wherein the tip clearance is 10% of a tooth width of the trapezoidal thread.

6. The brake booster of claim 1, wherein the external toothing and the internal toothing are formed for axial displacement of the spindle nut relative to the drive ring gear.

7. The brake booster of claim 1, wherein the spindle nut includes an axial stop interacting with the drive ring gear.

8. The brake booster of claim 7, further comprising a spring that presses the spindle nut with the axial stop against the drive ring gear.

9. A motor vehicle brake system comprising:
   a brake pedal that is mechanically connected to a pressure piston of a brake master cylinder; and
   a brake booster that includes:
      a drive motor; and
      a gear unit that is configured to convert a rotational motion of the drive motor into a translational motion of the pressure piston to actuate the brake master cylinder and that includes:
         a rotatable spindle nut including a first trapezoidal thread; and
         a non-rotatable spindle rod including a second trapezoidal thread that intermesh with the first trapezoidal thread with a flank clearance and a tip clearance that are greater than a bottom clearance between the first and second threads;
      wherein the spindle nut includes an external toothing that engages with an internal toothing of a drive ring gear of the gear unit.

10. A brake booster for a brake master cylinder of a motor vehicle, the brake booster comprising:
    a drive motor; and
    a gear unit that:
       includes:
          a rotatable spindle nut including a first trapezoidal thread; and
          a non-rotatable spindle rod including a second trapezoidal thread that intermesh with the first trapezoidal thread with a flank clearance and a tip clearance that are greater than a bottom clearance between the first and second threads; and
       is configured to convert a rotational motion of the drive motor into a translational motion of the spindle rod to actuate the brake master cylinder;
    wherein the spindle nut includes an external toothing that engages with an internal toothing of a drive ring gear of the gear unit.

* * * * *